United States Patent
Schlenner

(10) Patent No.: US 6,948,208 B1
(45) Date of Patent: Sep. 27, 2005

(54) SHOVEL AND KNIFE TOOL

(76) Inventor: Eva Lee Ann Schlenner, 118 N. Brewer Dr. Apt 24B, Battle Creek, MI (US) 49015

( * ) Notice: Subject to any disclaimer, the term of this patent is extended or adjusted under 35 U.S.C. 154(b) by 0 days.

(21) Appl. No.: 11/138,627

(22) Filed: May 26, 2005

(51) Int. Cl.[7] .................................................. B25F 1/00
(52) U.S. Cl. .................................. 7/116; 7/167; 294/51
(58) Field of Search ............................ 7/116, 167, 168; 403/373; 294/2, 51, 53.5

(56) References Cited

U.S. PATENT DOCUMENTS

| | | | |
|---|---|---|---|
| 2,377,730 A | 6/1945 | Vosbikian | |
| 3,824,641 A | 7/1974 | Shandel | |
| 4,287,623 A | * | 9/1981 | Tarran ............................ 7/158 |
| 4,475,757 A | 10/1984 | Glock | |
| 4,622,707 A | 11/1986 | Finn | |
| 4,727,609 A | 3/1988 | Smith, Jr. | |
| D299,375 S | 1/1989 | Pipes | |
| 5,507,051 A | * | 4/1996 | Mazon ............................ 7/116 |
| 5,810,408 A | * | 9/1998 | Armstrong .................... 294/57 |

\* cited by examiner

Primary Examiner—Jacob K. Ackun, Jr.
(74) Attorney, Agent, or Firm—Lawrence J. Gibney, Jr.

(57) ABSTRACT

This is a combination shovel and knife device for for campers and survival training. It will be lightweight yet durable and can be folded for easy storage.

6 Claims, 5 Drawing Sheets

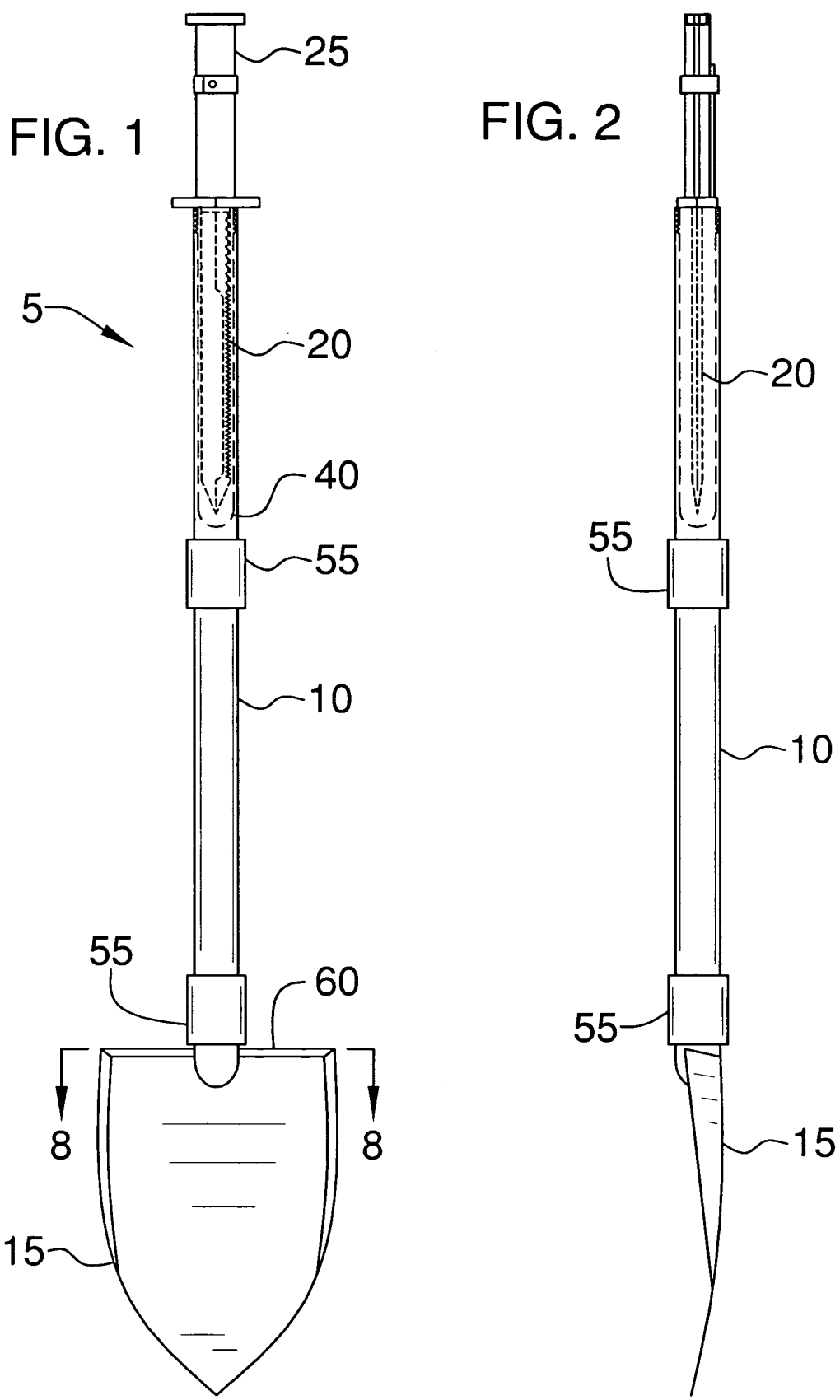

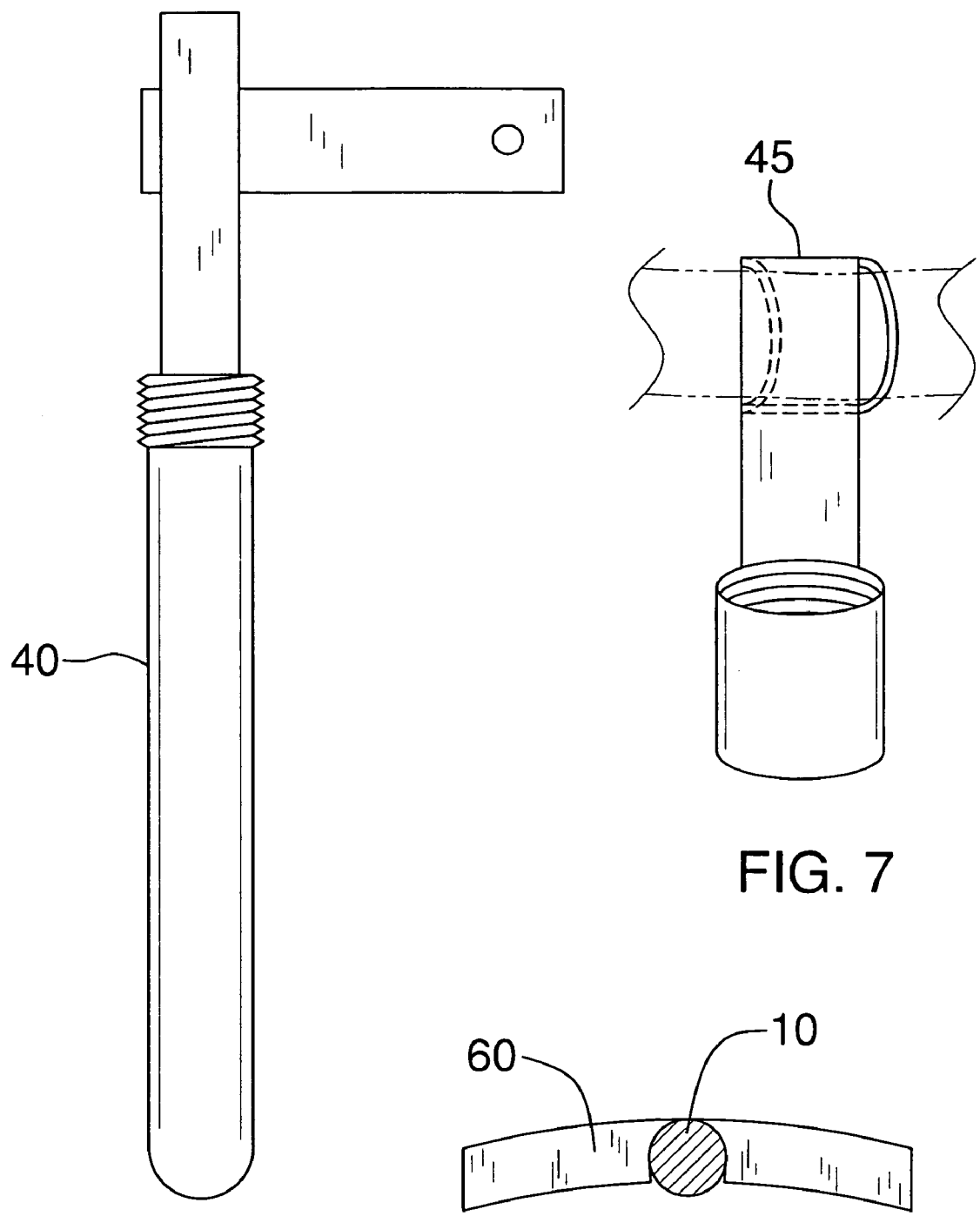

SHOVEL AND KNIFE TOOL

BACKGROUND OF THE INVENTION

A. Field of the Invention

This relates to combining survival or camping tools into one device and specifically a knife and shovel combination.

B. Prior Art

Particularly when an individual is camping, space is generally at a premium. It is inefficient to take tools, which do not dismantle or fold because of space considerations.

It is also unwise to not take a tool, which is necessary. Shovels and knifes are necessary in camping endeavors.

Other devices, which attempt to combine certain tools include, Glock, U.S. Pat. No. 4,475,757, Shandel, U.S. Pat. No. 3,824,641, Smith, U.S. Pat. No. 4,727,609. However, the devices do not specifically allow the device to be dismantled and stored in a carrying case for ease of use and transport.

BRIEF SUMMARY OF THE INVENTION

This is a device, that will house a knife individually or a shovel individually and allow the two devices to be combined into one unit.

A knife is adaptable to fit within the shaft of the shovel while encased in its sheath. The knife may also be attached to the individual's belt during camping and/or survival exercises separate from the shovel device.

The shaft of the shovel is provided with hinges and locking couplings to allow the shovel to be easily folded. The entire device can be folded and stored in a carrying case with its accessories.

Additionally, a standard shovel handle and shovel blade will also be included with this device in the event that the knife is not needed and a shovel is necessary.

It is an object of this device to combine a shovel and a knife for camping and/or other outdoor activities. It is a further object to allow the parts of the shovel to fold for easy storage.

BRIEF DESCRIPTION OF THE DRAWINGS

FIG. 1 is a front view of the device showing the knife in the shovel handle.

FIG. 2 is a side view of the device showing the knife in the shovel handle.

FIG. 6 is a front view of the sheath.

FIG. 7 is a front view of the belt attachment.

FIG. 8 is a cross sectional view according to line 8—8 on FIG. 1.

DETAILED DESCRIPTION OF THE EMBODIMENT

Figure 3:
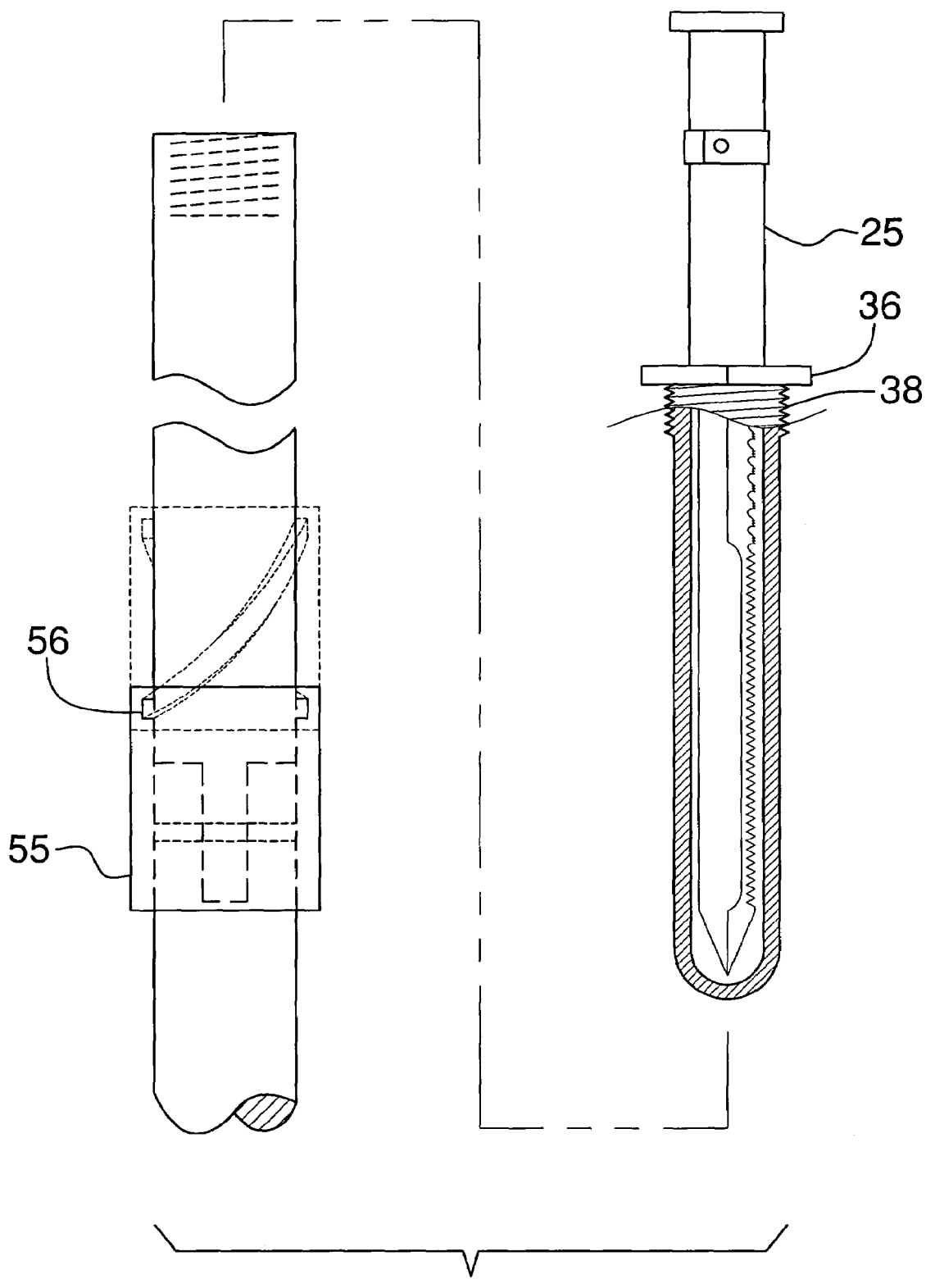
FIG. 3 is a partially exploded view of the sheathed knife in the hollow shovel shaft and the hinge and locking coupling.

This device 5 combines the functions of a shovel with a knife. Specifically, the shovel head 15 is attached to a shovel shaft 10. FIGS. 1, 2 At the opposite end from the shovel is a portion of the shovel shaft, which is hollow. A knife 20 can be stored within this part of the shaft within a sheath 40 for the knife. The knife 20 can be stowed within the sheath 40 and placed inside the shovel shaft. FIGS. 1, 2, 3.

Figure 9:
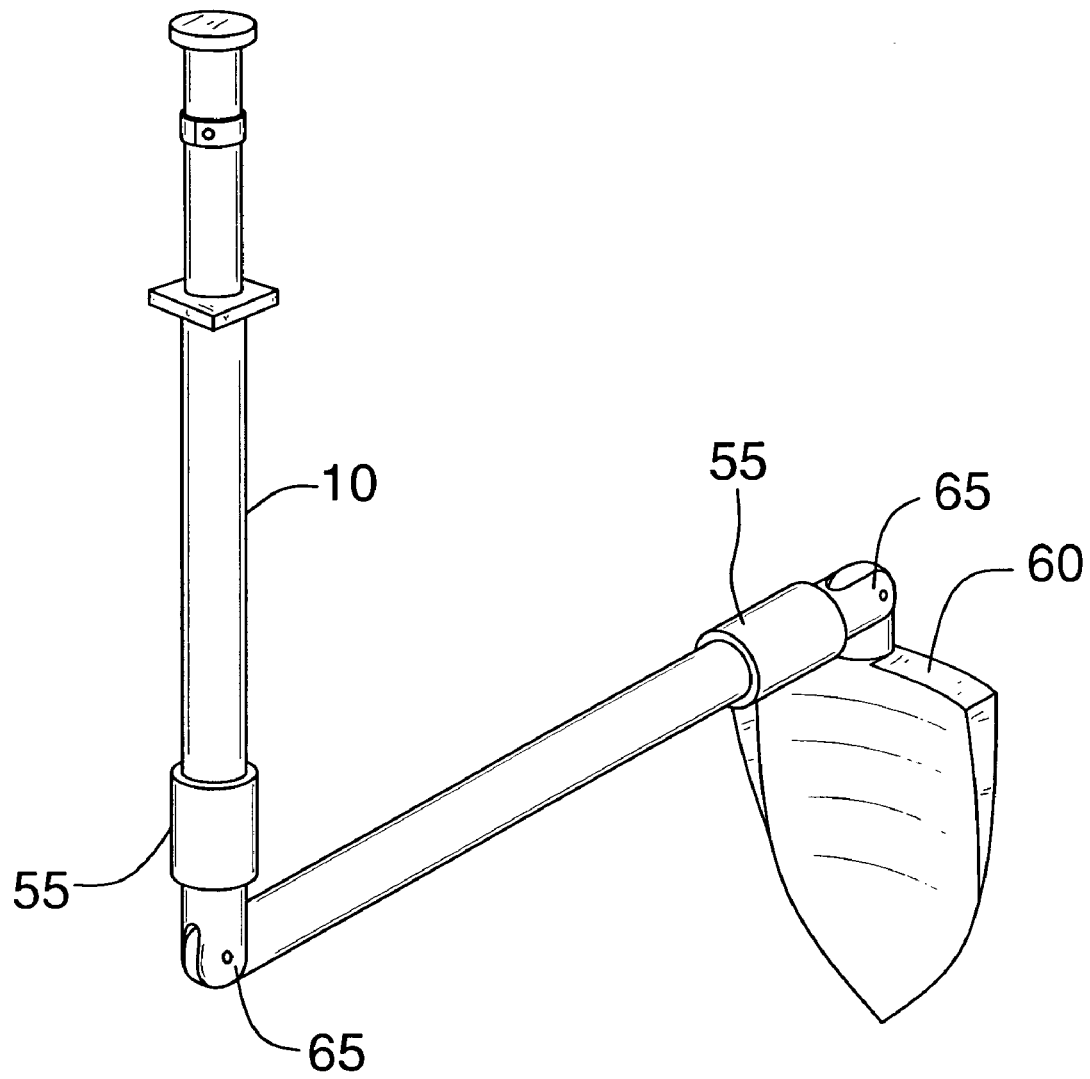
FIG. 9 is an isometric view of the device in the partially folded position.

The device 5 has a plurality of hinges and locking couplings 55 to allow the devices to be folded for easy storage. One of the hinges is located at one end of the shovel shaft 10 near the junction of the shovel shoulder 60. The other hinge is located in the approximate middle of the shovel shaft. Locking couplings slide over the respective hinges 65 to lock the device in position. FIGS. 1, 2, 9.

The locking coupling 55 is held in position by a plurality of indentations 56 on the shovel shaft. These indentations 56 prevent the locking coupling from sliding down the shovel shaft 10. FIG. 3.

The knife 20 in its protective sheath 40 fits within the interior bore of the shovel shaft 10. FIGS. 1, 2 The knife 20 is equipped with a handle at a first end and the tip of the blade at the second end. On the sheath is a flange 36 and threads 38, which allow the sheath to be secured in the shovel handle. Also on the sheath is a safety strap that allows the knife to be secured in the sheath. FIG. 3.

Figure 4:
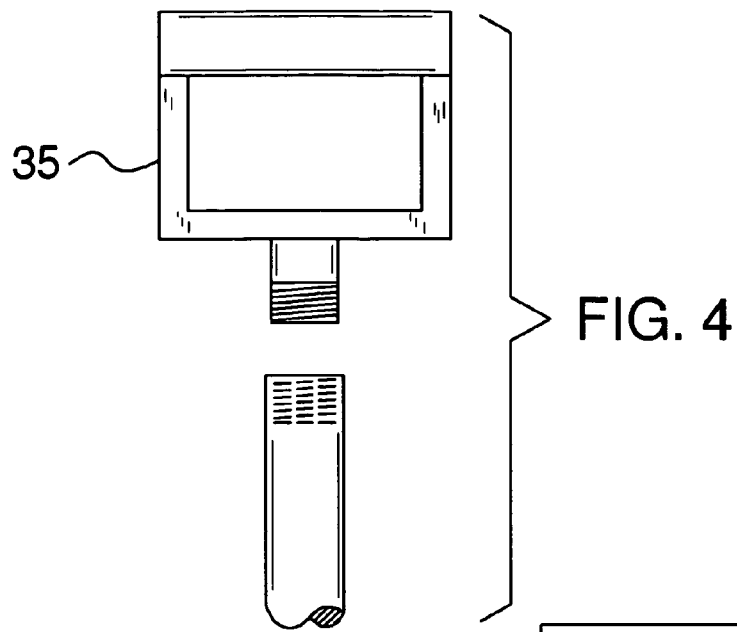
FIG. 4 is a partially exploded view of the shovel shaft and the shovel handle.

Alternatively, the shovel hollow portion of the shaft 10 will also accommodate a standard shovel handle 35 in the event that a knife 20 is not needed or the knife 20 is being carried on the individual's belt. FIG. 4 FIG. 2 is a representation of the side view of the device with a knife 20 installed within the sheath and inserted in the shovel handle 10.

Figure 5:
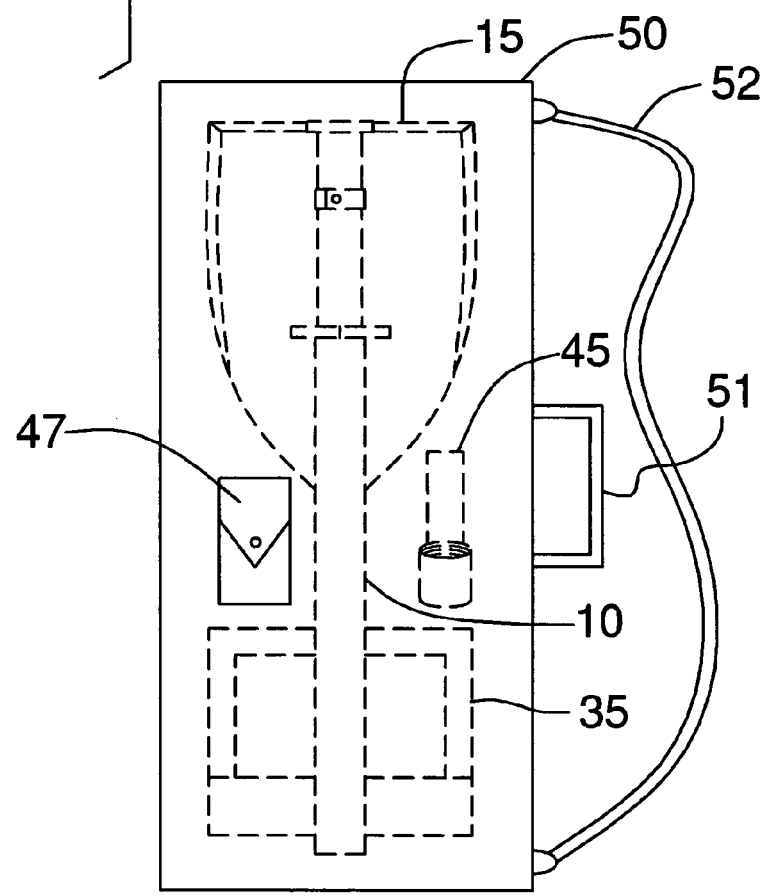
FIG. 5 is a representation of the individual parts stored in the case.

One of the advantages to this device is that it may be folded and placed in a handy convenient case 50 for storage and transport. FIG. 5. This would include the folded shovel 15, accessory shovel handle 35, detachable shoulder strap 52, and the accessory belt attachment 45. A storage pocket 47 for the detachable shoulder strap 52 will be provided. FIG. 5. The carrying case 50 like the device will be made of durable material because this device will most likely be exposed to the elements and extremes in temperature and extremes in environment. The carrying case 50 will be equipped with a handle 51 and a detachable adjustable carrying strap 52. FIG. 5 Additionally, the knife 20 will be housed in its own sheath 40 for additional protection. FIG. 6.

The knife may also be worn on an individual's belt by screwing the sheathed knife 20 into the coupling for the belt attachment 45. FIG. 7.

The device 5 will be made of durable material but light weight enough to be able to transport the device easily.

Aluminum or lightweight steel are preferable choices, although hard plastics may also be used for the shovel shaft and knife handles.

While the embodiments of the invention have been disclosed, certain modifications may be made by those skilled in the art to modify the invention without departing from the spirit of the invention.

The inventor claims:

1. A combination knife and shovel tool, which is comprised of:
   a. shovel;
   wherein the shovel is equipped with a shovel head;
   where a shovel handle is provided;
   wherein a shovel shaft is provided;
   b. plurality of hinges;
   wherein the plurality of hinges allow the device to be folded;

c. a plurality of locking couplings;

wherein the locking couplings maintain the rigidity of the shovel shaft;

d. a knife;

wherein the knife is inserted into a protective sheath which is equipped with a safety strap to keep the knife in the sheath;

wherein the protective sheath fits within the hollow shaft of the shovel;

e. an accessory belt attachment for the sheath.

2. The combination as described in claim 1, wherein the shovel shaft is of sufficient diameter to stow the knife within the protective sheath.

3. The combination as described in claim 1 wherein it is constructed of steel.

4. The combination as described in claim 1 wherein it is constructed of aluminum.

5. The combination as described in claim 1 wherein it is constructed of hard plastic.

6. The combination as described in claim 1, wherein a belt attachment is used to carry the knife encased in said sheath on a person's belt.

* * * * *